UNITED STATES PATENT OFFICE.

THOMAS R. FERGUSON AND ELMER L. LARSON, OF CHICAGO, ILLINOIS, ASSIGNORS TO ALFRED O. BLAICH COMPANY.

PRODUCT FOR CARBONIZING STEEL.

1,343,359.  Specification of Letters Patent.  Patented June 15, 1920.

No Drawing.   Application filed August 18, 1919. Serial No. 318,371.

*To all whom it may concern:*

Be it known that we, THOMAS R. FERGUSON and ELMER L. LARSON, citizens of the United States, residing at Chicago, in the county of Cook and State of Illinois, have invented a certain new and useful Improvement in Products for Carbonizing Steel, of which the following is a full, clear, concise, and exact description.

Our invention relates to a new product for use in carbonizing steel or iron.

Any process for increasing the carbon content is generally known in the arts as carbonization, pack hardening, cementation, or possibly by other terms. In the description herein and in the claim, we will use the words carbonizing or carbonization as intending to mean the increase, broadly speaking, of the carbon content of steel or iron, intending this term to include such others as those above mentioned and similar or equivalent processes.

In the arts it is highly desirable to have at hand a product which can be used by the application of heat to increase the carbon content present in steel or iron. If, for instance, a low carbon steel be heated when surrounded by the product of our invention, we find that the steel takes on additional carbon and this carbonization extends to a very material depth. In a specific case wherein we have used our product in connection with a half-inch rod, we find without carrying the heating to its limits, that carbon is introduced to a depth of at least three-sixteenths of an inch.

It must be understood that one of the major uses of carbonizing consists in increasing the carbon content of low carbon steels. High carbon steels of course can be readily obtained in the market, but they do not lend themselves so readily to certain processes of manufacture or working. For this reason low carbon steels must be used, and in order to have the required characteristics for subsequent use, must have the carbon content of their periphery increased, the core or central portion preferably remaining as before with low carbon content to maintain ductility.

The product which we prefer to employ is charred nut shells. We find that pecan shells, Brazil nut shells, walnut shells, or other shells having similar characteristics will, when suitably charred, produce the desired carbonizing effects.

The charred shells used are placed in a closed retort with the steel and heated to about 1600° F. It sometimes happens that the temperature accidentally runs higher and probably as high as 1800° F. We believe that any hard nut shells which will char and not turn to ashes under these temperatures will serve equally as well in the carbonization process. We believe that the shells of hickory, cocoa and butter nuts may be used instead of the shells of walnuts or Brazil nuts.

We will describe specifically the use of Brazil nut shells as one form of carrying out of our invention.

When Brazil nut shells are used to provide our product, we place them in a suitable container and roast them over an ordinary flame, shaking them in the meantime until they are thoroughly charred, and have the appearance of charcoal. The shells may be ground up either before or after charring or roasting. The charring has the effect of driving off the moisture and oils which are normally present in the shells so that after roasting these shells are thoroughly dry so as not to injuriously influence the carbonization of steel or iron.

The improved product consists of these charred nut shells and when they are used for carbonizing, they are packed tightly around the steel or other material which is to be carbonized and the whole is preferably placed in a sealed container and subjected to the influence of heat, which in a specific instance may be to the temperature of 1650° F. This heating is continued for the required period which period varies quite largely, its length depending upon the material acted upon, and may be all the way from one hour to several days. The steel thus carbonized has additional carbon introduced into its pores, thus placing the material acted upon in such condition that it may be the more readily tempered or hardened. The principal object, as before stated, is to increase the carbon content of the steel.

We believe that the reason why Brazil nut or other similar nut shells are so well adapted for the above use is due to the fact that during the process of carbonization the charred shells throw off gases which, permeating the pores of the steel, introduce the carbon therein.

We have conducted extensive experiments and find that we are enabled by the use of the product herein disclosed to effect carbonization in a much shorter time than has hitherto been possible, and that we are enabled even in this shorter time to bring about a more enhanced carbonization of the steel.

It must be understood, naturally, that we do not mean to say that the carbonizing material which is to be used must consist in its entirety of our new product, as satisfactory results can be obtained by the use of our improved product as an ingredient with other products, as part of a mixture adequate for the purpose.

From what has been thus described, the nature of our invention will be readily clear to those skilled in the art, as will also its various modifications and adaptations.

Having, however, thus described one form which our invention may take, what we claim as new and desire to secure by Letters Patent is:

A steel carbonizing ingredient consisting of charred Brazil nut shells.

In witness whereof we hereunto subscribe our names this 12th day of July, A. D. 1919.

THOMAS R. FERGUSON.
ELMER L. LARSON.